United States Patent [19]
Wilckens et al.

[11] 3,784,969
[45] Jan. 8, 1974

[54] AIRCRAFT LANDING DISPLAY APPARATUS

[76] Inventors: Volkmar Wilckens, 2 Nebeler Str., Unterpfaffenhofer 8034; Wolfram Schattenmann, No. 62 Memekrstrasse, Munich, both of Germany

[22] Filed: Dec. 29, 1971

[21] Appl. No.: 213,593

Related U.S. Application Data

[63] Continuation-in-part of Ser. No. 772,511, Nov. 1, 1968, abandoned.

[52] U.S. Cl.............................................. 340/27 NA
[51] Int. Cl................................................ G08g 5/02
[58] Field of Search ............... 340/26, 27 R, 27 AT, 340/27 NA; 343/108 R, 108 ST

[56] References Cited
UNITED STATES PATENTS
3,037,382  6/1962  Aid et al........................ 340/27 NA
3,521,228  7/1970  Congleton et al. .................. 340/27

Primary Examiner—Kathleen H. Claffy
Assistant Examiner—Thomas L. Kundert
Attorney—Markva & Smith

[57] ABSTRACT

Display apparatus for use on aircraft is designed to present all the required guidance information in pictorial form for use by a pilot permitting him to land an aircraft on the basis of the pictorially presented information even under the worst visual conditions.

17 Claims, 36 Drawing Figures

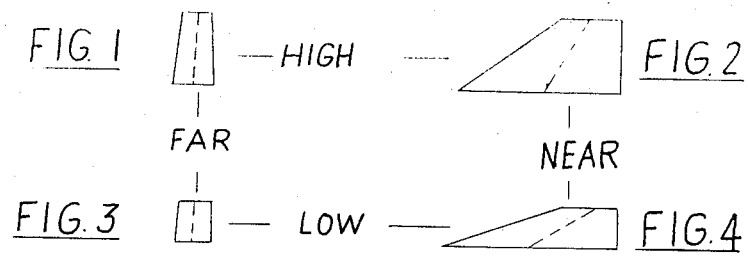
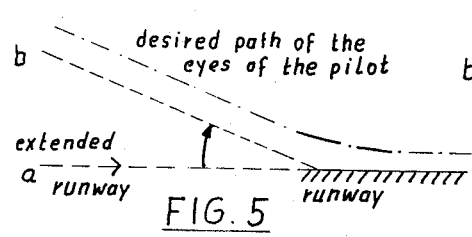
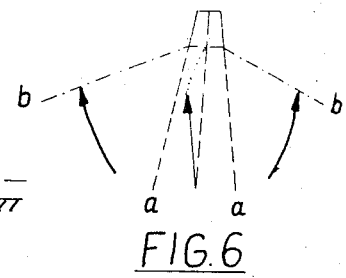
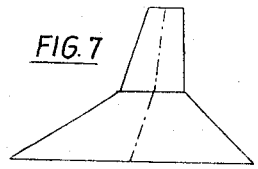
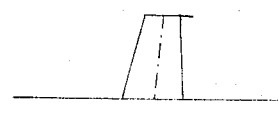
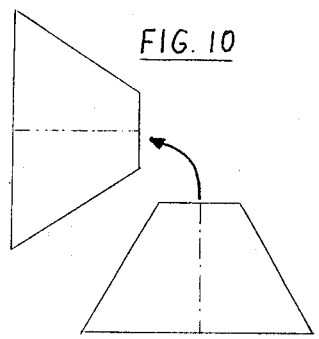
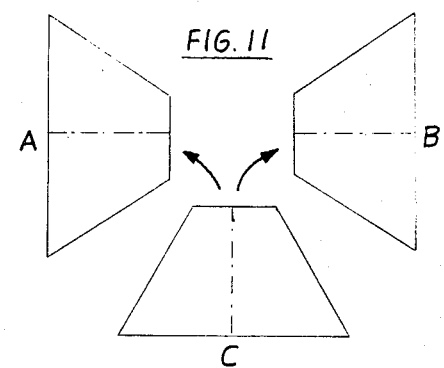

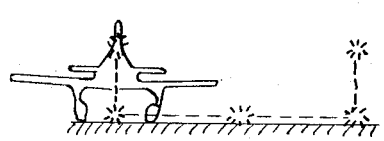
FIG. 18

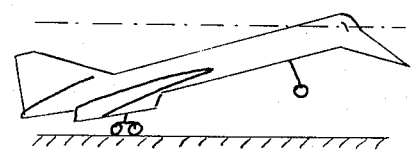
FIG. 19

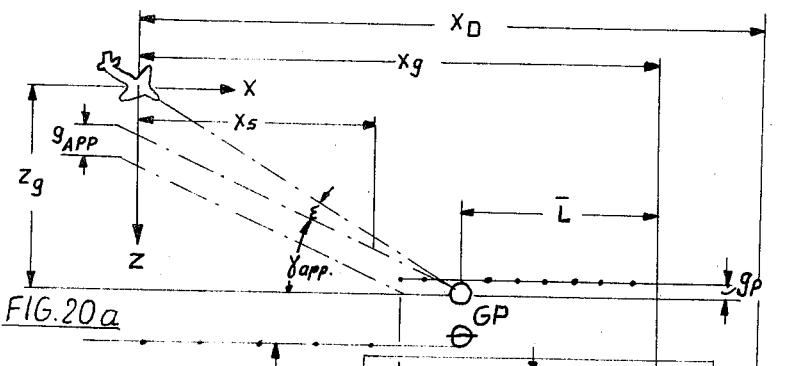
FIG. 20a

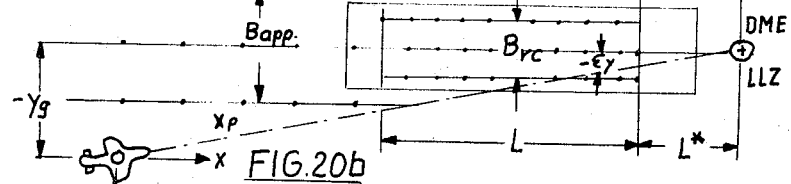
FIG. 20b

FIG. 21

| coordinate | equation | dot N° | validity |
|---|---|---|---|
| $X_n$ | $x_s - n \cdot \Delta x$ | 1 2 3 4 5 | $\gtrless 0$ |
| $Y_{ni}$ | $Y_g + \begin{cases} -.5\, B_{app} \rightarrow \\ 0 \rightarrow \\ +.5\, B_{app} \rightarrow \end{cases}$ | 1  2<br>  3<br>4  5 | $X_g - X_n - L \begin{cases} > 0 \\ \leq 0 \end{cases}$ |
|  | $Y_g + \begin{cases} -.5\, B_{rc} \rightarrow \\ 0 \rightarrow \\ +.5\, B_{rc} \rightarrow \end{cases}$ | 1  2<br>  3<br>4  5 |  |
| $Z_{ni}$ | $z_g - (X_g - X_n - L)\, \gamma_{app} + \begin{cases} g_{app} \\ 0 \end{cases}$ | 2 3 4<br>1   5 | $X_g - X_n - L \begin{cases} > 0 \\ \leq 0 \end{cases}$ |
|  | $z_g + \begin{cases} -g_p \\ 0 \end{cases}$ | 1   5<br>2 3 4 |  | i=2 in this example

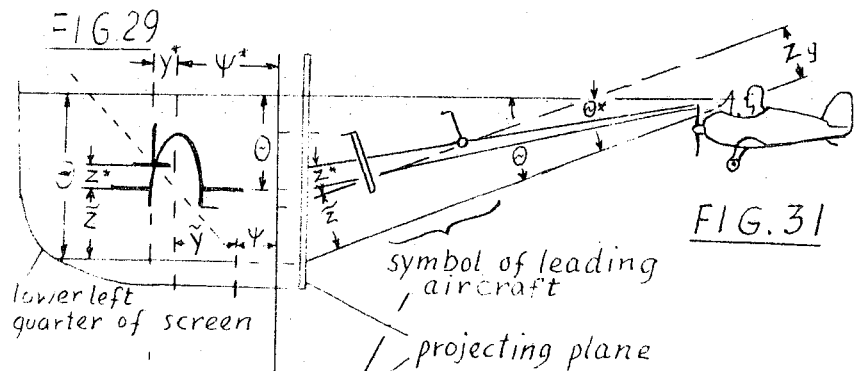
FIG.29
FIG.31
symbol of leading aircraft
projecting plane
lower left quarter of screen
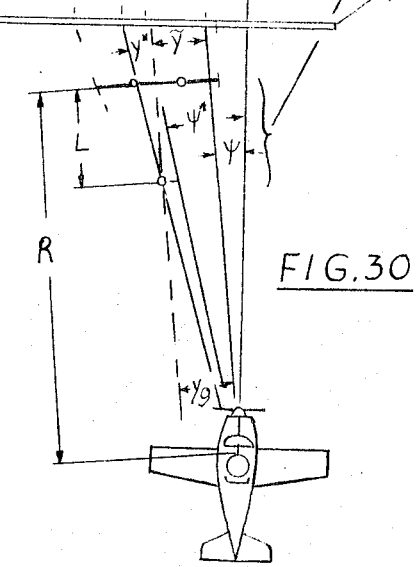
FIG.30
FIG.33
FIG.32

AIRCRAFT LANDING DISPLAY APPARATUS

This is a continuation-in-part of our copending U.S. Pat. application Ser. No. 772,511 filed Nov. 1, 1968 and now abandoned.

This invention relates to apparatus for use by an aircraft pilot during landings under adverse weather conditions and more particularly relates to a pictorial display apparatus for an aircraft pilot.

BACKGROUND OF THE INVENTION

Substantial improvements have been made in guidance systems for aircraft which are designed to automatically control aircraft landings under adverse visual conditions. These automatic controls commonly known as autopilots restrict the role of the human pilot to one of monitoring the autopilot. A disadvantage of control equipment for fully automatic landings is that the human pilot under adverse weather conditions does not have all of the information he needs to properly monitor the control equipment. There is still a need for devices capable of transmitting the required information to the pilot. Automatic guidance equipment cannot be absolutely 100 percent reliable and there is need for improved equipment by which the human pilot can be put in possession of information needed to monitor the automatic control equipment. The human pilot should be in a position to take over and complete a landing safely under adverse weather conditions when the autopilot is in error.

There is also a need for equipment designed to transmit all of the necessary information to a pilot for landing an aircraft under poor visual conditions where the aircraft does not have an autopilot, since such automatic equipment is both costly and adds weight to the aircraft.

The systems presently available for transmitting information to the pilot for all weather landings are not sufficiently sensitive and if their sensitivity were increased it would make such systems dynamically unstable. Furthermore, the human pilot is required to scan a substantial number of indicators which he can only do at a comparatively low rate. Thus, in the final phases of a landing operation which are considered to be most demanding during the flight of an aircraft, the pilot cannot manually control the aircraft or even properly monitor the autopilot at a satisfactory level of safety under low visibility weather conditions. The precision control portion of a landing lasts only about 10 to 20 seconds. Thus, even the best trained pilot always has as his goal "the perfect landing" even under the best visibility conditions. The instrumentation now available to a pilot does not permit perfect landings under low visibility conditions. Modern instrument systems are far from being equivalent to a good visual image of the landing site. It had previously been thought that if an image of the landing site could be present on a screen for the pilot's information, this would resolve the problem of landing during adverse weather conditions. However, this does not entirely resolve the problem, since such an image though it does provide sensitive information for lateral guidance in the final landing phase and during takeoff ground roll, information relative to vertical position (height) and from a far distance is poor.

Modern "director" displays have been designed to avoid the necessity for a human pilot to simultaneously observe a number of separate information sources and to correlate them by presenting command signals which are automatically computed from a number of individual signals. The pilot simply follows the command signals in order to fly an asymptotic interception of the desired path. Thus, his role is reduced to that of simply actuating the aircraft controls. The command signals do not tell him the basis for each of the command signals and thus the human pilot is subjected to considerable anxiety since the command signals might be in error and lead to an accident. The result is that the pilot senses a need to check the validity of command signals and thus continues to divert his attention to the conventional instruments and in doing this, he does not give his full attention to the command signals which, e.g. during an asymptotic interception of the straight approach path frequently call for change in pitch attitude and heading. The interruption of the continuous observation of the primary guidance signals to scan other information necessarily degrades the accuracy of the flight path control.

The presently known systems which give the human pilot pictorial presentations leave much to be desired. The various pictorial elements are not as realistic or as sensitive as they should be and thus do not enable the pilot to naturally associate what he sees on the screen and his sensations of motion. Furthermore, such pictorial displays present the information qualitiatively only and therefore scales, pointers, numbers and directors are also required so that the human pilot still is required to scan the several primary sources of guidance information. qualitatively The shortcomings of the known display systems have caused marginal human performance. In zero visibility the pilot is frequently unable to perform landings with sufficient reliability. It is for this reason that the autopilot has been adopted which, as pointed out previously, makes the role of the human pilot not one of manually controlling the aircraft but rather of supervising and monitoring the progress of the flight. The present invention is designed to furnish the human pilot with a complete pictorial display having a high sensitivity such that the human pilot may rely upon it even under zero visibility conditions to manually control the aircraft, particularly during landings.

DESCRIPTION OF THE INVENTION

The invention will now be described with reference to the accompanying drawings wherein FIGS. 1, 2, 3 and 4 are typical perspective views of a rectangular landing field as seen from different high/-low and far/near positions by an aircraft pilot during approach;

FIGS. 5 and 6 show diagrammatically in the localizer plane and in a perspective view, respectively, the method used to adapt the favorable information chracteristics of a runway to the requirements for lateral guidance along a straight approach slope;

FIGS. 7, 8 and 9 are perspective views of the symbols derived from FIG. 6 as seen from three typical vertical positions, i.e., above, below and within the plane of the runway;

FIGS. 10 and 11 show graphically how the same information elements are added for guidance in the vertical direction of movement of the aircraft relative to the runway;

FIG. 18 shows the principles involved in calibrating the width of a channel;

FIG. 19 shows the principles involved in calibrating the height of a channel;

FIG. 20A shows graphically an example of the channel geometry as applied for approach and landing guidance in the localizer plane;

FIG. 20B shows graphically an example of the channel geometry as applied for approach and landing guidance in plan view;

FIG. 21 shows in table form the system of equations for computing the coordinates for the dots in the geodetic coordinate system;

FIGS. 29, 30 and 31 illustrate graphically the relationship between the variables in a perspective view, a plan view, and a localizer plane, respectively;

FIGS. 32 and 33 illustrate how the aircraft symbol indicates flare start;

FIGS. 1–4 which are typical perspective views of a rectangular landing field indicate both the favorable and unfavorable quality of information conveyed by such views. For example, when the runway is viewed from a distance during approach, a 50 percent altitude change or 50 percent offset from the center of the runway makes very little change in the image of the runway. On the other hand, at near-by position, such as during ground roll, any changes in the position from which the runway is viewed will make a marked change in the image and thus have excellent information quality. It therefore follows that the symbol for the runway as viewed by the pilot should extend into the runway approach sector and be hinged upwardly closely below the predetermined path of the eyes of the pilot as shown diagrammatically in FIGS. 5 and 6.

This same concept if carried out for all of the planes required for guidance during landing will result in the pilot being able to maintain more precise control over the path of the airplane. (It will be appreciated that a symbol representing simply a pathway on the ground is not satisfactory.) With the new concept described above it is possible for the pilot to have continuous quantitative information on lateral deviations from the desired path with similar precision as that of a driver of a car on a highway, if his eyes will more at a constant height above the imaginary extended runway. However, the pilot may, of course, fly above or below the extended runway path, as demonstrated in FIGS. 7 and 8, or his eye may be within the plane of the extended path as demonstrated in FIG. 9. In this latter case, though the image presents accurate vertical information, no lateral information is presented. Thus, there is need for some additional information indicating what is the proper height above the extended runway path.

FIGS. 10 and 11 demonstrate how the same information elements may be added to the extended runway path image to give guidance in the vertical direction of movement of the aircraft relative to the runway. Thus, the vertical images A and B on opposite sides of the extended runway image C permit the utilization of the "street" symbol to give the pilot guidance in both the vertical and horizontal planes.

Figure 12:
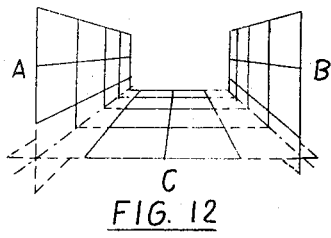
FIG. 12 shows the three separate information elements combined to a single compact element forming a channel section.
Figure 13:
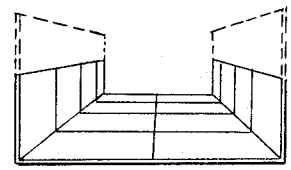
FIG. 13 is a perspective view of the channel element shown in FIG. 12 with the upper part of the channel omitted since it is superfluous in certain flight phases.

This concept demonstrated in FIG. 11 is used in the formation of a "channel - symbol" shown in FIG. 12 where the three planes A, B and C are combined. This is modified somewhat in FIG. 13 where the upper parts of planes A and B are omitted to simplify the channel-symbol.

It will be appreciated that with the three elements A, B and C tied together, the width of the three paths in the three planes and the sensitivity of any lateral and/or vertical offset indications are coupled. The width of the paths is calibrated so that the channel symbol integrates the guidance information itself and together with motion tolerance indication. It has been found that the sensitivity of this information, as viewed by the pilot, is extremely good.

Figure 14:
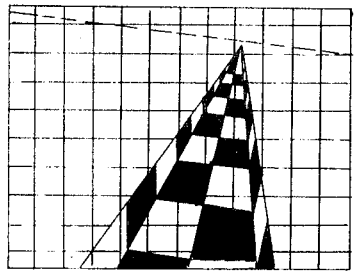
FIGS. 14, 15 and 16 show various channel sections produced from planes, lines and dots, respectively, FIG. 14 showing the channel section from a position high/right, FIG. 15 showing a small deviation low/left from the desired path, and FIG. 16 exactly on the desired path. In each of these figures the horizon is shown by dashed lines.
Figure 15:
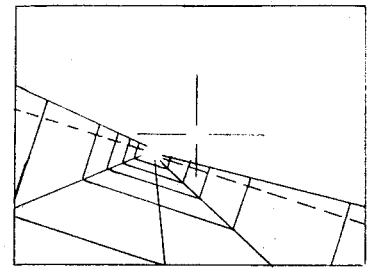
Figure 16:
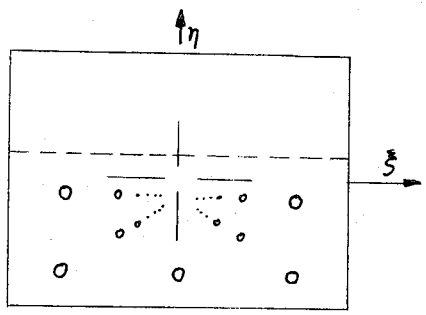
Figure 17:
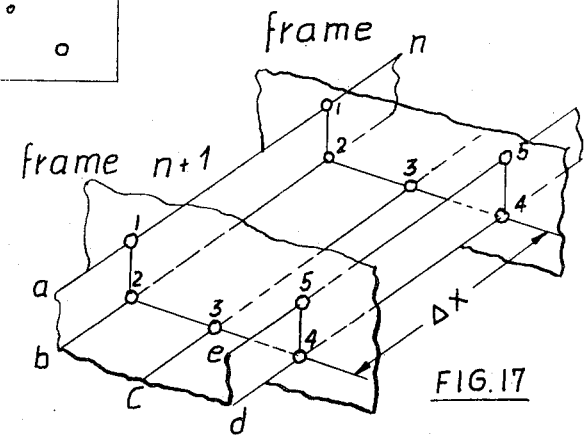
FIG. 17 shows graphically how the presentation by dots is achieved by equidistant planes intersecting the five lines of a channel element.

The channel-symbol is formed on the screen of a cathode ray tube using various electronic techniques. The graphic elements may be in the form of planes, lines or dots which may be projected separately or in combination, as shown in FIGS. 14, 15 and 16. The planes and lines techniques (FIGS. 14, 15) present the most convincing spatial illusion. However, the simulation of the channel by cathode ray dots (FIG. 16), has the advantage of being similar to the actual impression sensed by the pilot during visual night landing approaches. FIG. 17 shows how the presentation may be achieved in form of dots, received by cross-sections through the 5 geometrically defined lines $a$, $b$, $c$, $d$ and $e$ (FIG. 17) at equal distances $\Delta x$.

It will be appreciated that the image viewed by a pilot expands from a center point as the aircraft moves forward. Thus, the elements of the image form a so-called "streamer pattern." Thus, the momentary direction of movement of the aircraft is identical with the center of expansion. If the image consists of certain visible points spaced from each other, the pilot can easily perceive the direction of motion without the need for equipment to sense and compute a velocity vector. The channelshaped dispersion of visible dots, lines and/or planes fixed in spaced relationship around the ideal landing flight path enables the pilot to detect the direction of motion and any deviations from the desired path by peripheral vision while his eyes are fixed on the center of the image. He, therefore, is able to control the flight path accurately.

An important feature of the display apparatus is that the fixed points in space are distributed in the form of a relatively narrow rectangular channel along the desired path which provides an effective streamer pattern. Although, as pointed out previously, the flight path vector need not be computed. With this image, it is possible to derive the flight path vector from the image itself. The location of the flight path vector is determined by the intersection of the prolonged motion tangents of all points of the expanding image wherein the motions due to pitch and yaw are not yet included or eliminated respectively. At least the noncoinciding motion tangents of two image elements (dots) are required to make a reliable determination of the desired intersection. The motion tangents may be computed using appropriate equations but a simpler way is the extension of the momentary direction of motion of points of the expanding image by cathode ray lines through the respective dots which are of such low intensity that the individual tangents are not visible. Only at the point where the tangents intersect do they become visible by accumulation and thus indicate the location of the flight path vector.

The channel, that is, the width of the bottom plane and the height of the vertical "fences," is calibrated to
1. provide quantitative pictorial information and tolerances as far as determined by obstructions, runway width, etc.,
2. produce the optimum sensitivity of information,
3. offer an effective streamer pattern of uniform sensitivity for the pilot, and
4. reduce and/or balance the constraint of the error indications of the centerlines.

These major objects depend upon the size of the channel image. Thus, the image must have certain dimensional limits as to runway channel width and the lower plane of the approach channel.

For purposes of calibration, another factor must be considered. The path of the pilot's eyes is not identical with the path of the extremities of the aircraft, as, for example, the wheels at touch down on the narrow runway. Thus, the width of that part of the channel, the centerline of which coincides with the actual runway, should be represented on the screen as being smaller than the actual width of the runway in order to provide sufficient safety margin between the outer wheels and the edges of the runway when the eyes of the pilot "touch" the respective fences (see FIG. 18). The "fences" of the runway channel provide the pilot with a useful quantitative pictorial indication of the wheel's height agove the runway. The height of the fences is calibrated so as to be at the elevation of the pilot's eyes when the wheels touch the runway (see FIG. 19). At this moment the perspective angle between the upper edges of the runway fences stretches to 180°, thus providing definite quantitative information which is not available when the pilot is viewing the actual scene. Where the aircraft rests on the ground with a high nose-up attitude as shown in FIG. 19, there should be a reduction in the fences' height or provision for an additional height line on the fences for the indication of the taxi attitude.

It is desirable, though not required, for the width of the approach channel to be modified to some extent compared to the runway channel. The narrower the channel, the higher is the sensitivity indicated to the pilot.

Advantageously, the ideal flight path is presented indirectly by the centerline of the bottom plane and the upper edges of the fences of the channel and not by a simulization of the flight path itself. If, as an example, the glide path is indicated by an analog presentation of the intersecting localizer and glide slope planes as suggested in the VIP-system (*Interavia*, February, 1962, page 179), the characteristics of the sensitivity would not be optimum and the perspective impression would be obscured when the aircraft is accurately on the glide path. The display element in such case is simply a cross which increases the tendency for pilot-induced oscillations. Furthermore, the presentation of tolerances, as given by the channel, would require additional display elements.

Thus, a system wherein combined runway-shaped pictorial elements provide the information for both lateral and vertical guidance using the graphic dot, line, or plane elements. The desired path is symbolized by a rectangular channel, generated by one bottom plane, having a centerline, and two vertical planes erected on opposite edges of the bottom plane. The intersection line of an invisible vertical plane through the centerline with the invisible plane through a pair of lines on the vertical planes represents the desired path of the pilot's eyes. The size of the channel, i.e., the distance of the three planes from the desired path, provides the sensitivity of deviation indication and tolerances for the motion of the airplane with respect to surrounding obstacles and other airplanes. The centerline of that part of the channel which provides information through the final phases of the landing coincides with the centerline of the runway and the channel extends into the approach sector sloping upwardly so that the pair of lines on the vertical planes coincide with the predetermined glide slope plane. The width of the channel along the runway is adapted to avoid any hazard resulting from the outer wheels of the airplane contacting the edge of the runway. The height of the vertical planes or fences is equal to the elevation of the pilot's eyes at the point of touch down, i.e., where the pilot feels the touch down when he observes the perspective angle of the upper edges stretched to 180°. Beyond this point the height of the fences is reduced or an additional height line is provided to indicate the elevation of the pilot's eyes above the runway surface while the aircraft is taxiing.

The generation of the channel display using the dots technique is demonstrated in FIGS. 20a and 20b. The approach channel is inclined according to the prescribed glide angle $\gamma_{app}$. The perspective appearance of the channel system depends upon the position of the aircraft, defined by $\epsilon_6$, $\epsilon_z$ and the distance $X_D$, determined, e.g., by the ILS-antennas (LLZ and GP) and a distance measuring equipment (DME). The fine height above the runway surface is provided by a radio altimeter (RA) on board the aircraft.

The position of the aircraft is computed from these data (FIG. 20) according to the equations:
$X_a = X_D - L^*$;

$Z_g = (\gamma_{app} + \epsilon_z) \cdot (X_g - L)$ (during approach)
$Y_g = \epsilon_y \cdot X_D$;
$Z_g = Z_{RA}$ (during flare phase) Heading and other attitude angles of the aircraft do not influence the perspective appearance of the channel system. These variables determine the location of the image on the display screen only.

The main advantage of the dots technique (FIG. 16) is the possibility of a cyclic computation of the dots within each intersecting plane (FIG. 17). The lateral and vertical coordinates $y_{ni}$ and $z_{ni}$ (FIG. 22) of the five dots defining a cross section of the channel are determined in an inner computing loop for a certain distance $X_n$. Starting from the far end of the channel, the distance $X_n$ is reduced stepwise by $\Delta X$ after computation of each five dots of a cross section or frame. As soon as all frames up to the position of the aircraft are computed, the display generator starts the whole cycle again; this at least 16 times per second to avoid flicker of the image.

Figure 22:
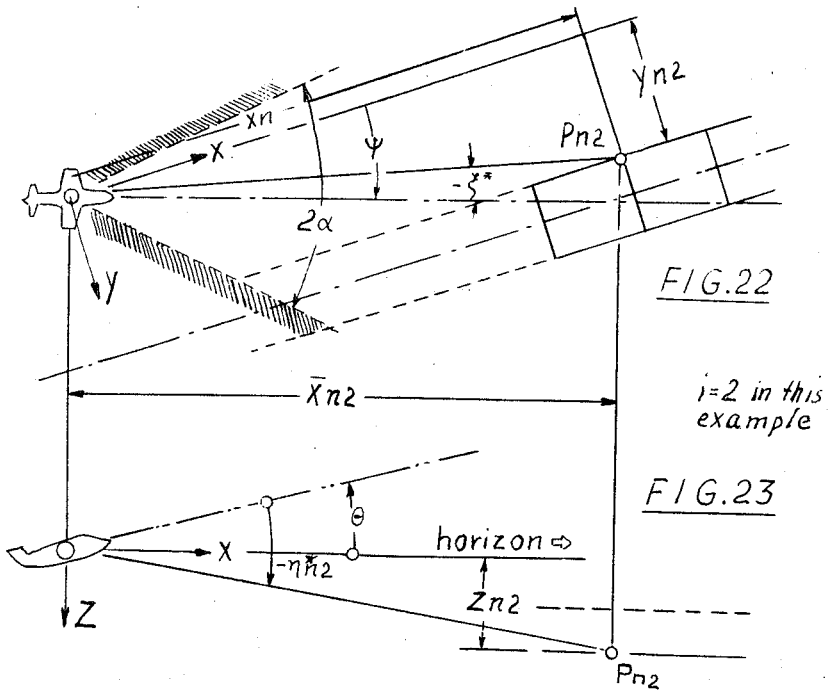
FIGS. 22 and 23 show in a plan view and in a view in the vertical plane, respectively, along the momentary direction of longitudinal axis of the aircraft the coordinate transformation.

FIG. 21 shows the system of equations for the dots coordinates in a geodetic coordinate system (FIG. 22). However, the channel image is displayed as an "inside-out" presentation. Thus, the coordinates $x, y, z$ have to be transformed into a two-dimensional perspective image on the display screen (FIGS. 22 and 23), i.e., in an aircraft fixed $\epsilon, \eta$-coordinate system (see FIG. 16).

In order to provide sufficiently sensitive information, the view angle will preferably be selected to be small: $|\alpha| \leq 0.3$ rad (for $\alpha$ see FIG. 22). That is, there will be no apparent distortion of the image. The error in presenting the areas of the angles $\epsilon$ and $\eta$ on a flat screen is negligible. The transformation is made in three steps: rotation by the yaw angle or heading difference $\psi$, where $\psi = 0$ is the direction of the runway centerline. According to FIG. 22, it is:

$$\epsilon^*_{ni} = -\psi + \tan^{-1}(Y_{ni}/x_n)$$

Figure 23:
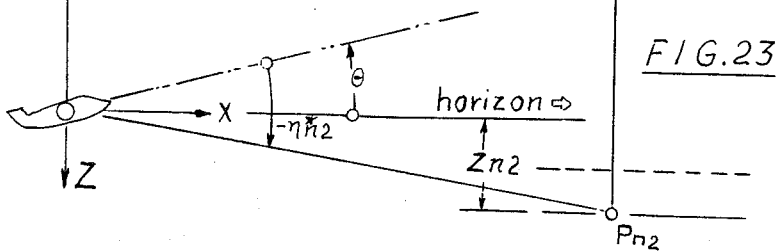

Rotation in pitch according to FIG 23:

$$\eta^*_{ni} = -\theta - \tan^{-1}(Z_{ni}/X_{ni})$$

where $\bar{x}_{ni} = x_n \cos \psi + y_{ni} \sin \psi$ (see FIG. 22). Both the equations for $\epsilon^*_{ni}$ and $\eta^*_{ni}$ already include the computation of the perspective distortion in the "$\tan^{-1}$" terms. Index "n" means the number of the frame and index "i" the number of the dot within a frame. $\epsilon^*$ and $\eta^*$ are the coordinates of the dots on the display screen for a bank angle $\phi = 0$.

The center of the scope is considered to be the face view of the longitudinal axis of the aircraft. Therefore, the roll angle of the aircraft effects a rotation of the whole image around the center of the screen as far as, in general, the aircraft rolls around its longitudinal axis. This leads to the well known third step of the transformation:

$$\epsilon_{ni} = \cos \phi \, \epsilon^*_{ni} + \sin \phi \, \eta^*_{ni}$$
$$\eta_{ni} = \sin \phi \, \epsilon^*_{ni} + \cos \phi \, \eta^*_{ni}$$

One dot of a frame needs 0.4 m sec. to be written by the cathode ray. One complete image consisting, e.g., of 10 frames has $5 \times 10 = 50$ dots and thus requires 20 m sec. For a flicker-free image produced with a rate of e.g., 20 cycles/sec., 400 m sec. are occupied. The residual 600 m sec. are available for additional symbols.

Figure 24:
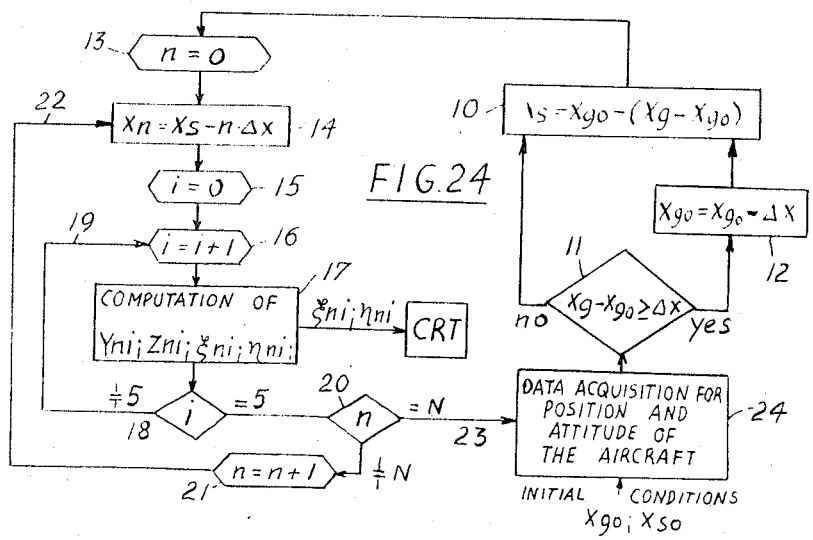
FIG. 24 is a flow diagram showing the sequence of computations required to generate a channel.

FIG. 24 shows a flow diagram of the generation of the channel. For different reasons it is desirable to restrict the effective range of visibility for the channel from possibly infinite to $X_s$. The dense accumulation of dots near the vanishing point of an infinite straight channel is undesirable in some cases. The computation time for one cycle is reduced considerably without marked deterioration of the information content and perspective impression if the far end of the channel is omitted. So the computation cycle can be run at a higher rate, which improves the image, or more time is available for additional symbols.

The distance $X_{so}$ of the cross section (or frame) at the far end of the channel is determined in a first step. Due to the movement of the aircraft this distance is shortened according to equation $X_s = X_{so} - (X_g - X_{go})$ (see box 10 in FIG. 24). As soon as the nearest perspectively expanding frame vanishes out of the field of view, the whole channel jumps forward by a step $\Delta X$, which is the horizontal distance between two sequencing frames. $X_g - X_{go} \geq \Delta X$; (see 11, FIG. 24). $X_{go}$ then becomes $X_{go} = X_{go} - \Delta X$ (see 12, FIG. 24). However, the jump appears to be a continuous extension of the range of vision due to the forward movement of the aircraft, because the near end of the channel has exceeded the display screen.

The part of the flow diagram (FIG. 24) below box ($n=0$) (13, FIG. 24) illustrates the circuitry for the cyclic generation of the dots, the frames, the whole image and the sufficient sequence of images respectively, as already mentioned before. $X_n = X_s - n\Delta X$ (14, FIG. 24) describes the distance of an individual frame from the observer in the aircraft. The computing cycle for the five dots starts with $i = 0$ (15, FIG. 24) for each frame and increases $i = i + 1$ (16, FIG. 24) after the previous dot has been determined. The coordinates $Y_{ni}, Z_{ni}$ and $\eta_{ni}$ are computed in block 17 according to the equations shown before and the outputs $\epsilon_{ni}$ and $\eta_{ni}$ are fed to the deflecting coils of the cathode ray tube. After each determination of a dot it is interrogated in block 18, if the number of five dots per frame has been reached. If not, the cycle continues along the feedback line 19 to 16, increasing $i = i + 1$. If $i = 5$, then it is interrogated in block 20 if the number of frames n has reached the maximum N. If not, n is increased by one in 21 and fed back via line 22 to 14. If $n = N$, then the loop is closed via line 23 to block 24 for data acquisition of attitude and position of the aircraft. The next image is generated then according to the procedure described above.

Figure 25:
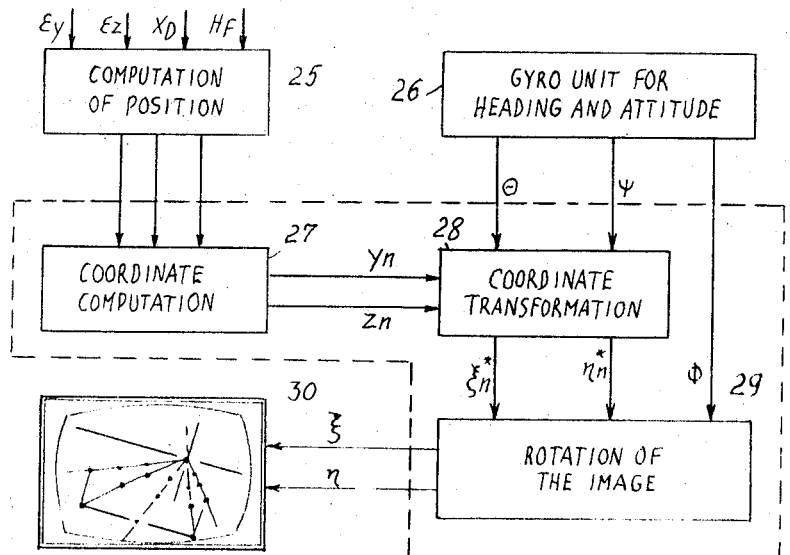
FIG. 25 is a block diagram showing the systems arrangement and the generating circuitry required for computing and displaying the channel.
Figure 26:
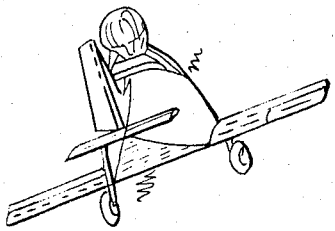
FIGS. 26 and 27 illustrate the derivation of a symbol representing the position of a preceding aircraft.
Figure 27:
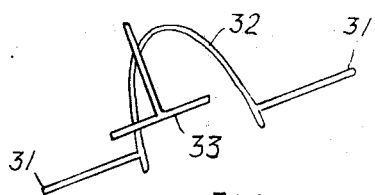

FIG. 25 shows the complete block diagram of the display generating system. The aircraft position is derived from the basic input data of any known or future guidance system in block 25. The coordinates for the display symbol are computed in block 27 according to the details of FIG. 24. In 28 the display symbol is transformed into the perspective image using the outputs from 27 and the pitch ($\theta$) and heading ($\psi$) data from a gyro unit 26. $\theta$ and $\psi$ are additive terms to $Z_n/X_n$ and $Y_n/X_n$ respectively according to the equations for $\epsilon^*_{ni}$ and $\eta^*_{ni}$. The final outputs of the display generator $\epsilon$ and $\eta$ are fed into the CRT-display 30 after a rotation in 29.

A further important part of the invention is the fact that this pictorially integrated channel information inherently possess preview and command indications. This is remarkable becasue basically the channel is a pure situation display. Command indications are available without the usual additional zero indicators and, therefore, it is up to the decision of the pilot, to which extent he wants to use this effect. He may select a high or a low, a constant or varying gain of the command indication.

The control program for the use of the director effect is very simple. The pilot has to control the aircraft fixed reticle of the display screen so as to intersect the visible part of the channel with the reticle lines at a certain fixed or varying distance in front of the aircraft. The rate of closure depends upon the fixed or varying position of the selected aiming point. The nearer the aiming point is chosen to the perspective center, the smoother the interception and vice versa.

Figure 28:
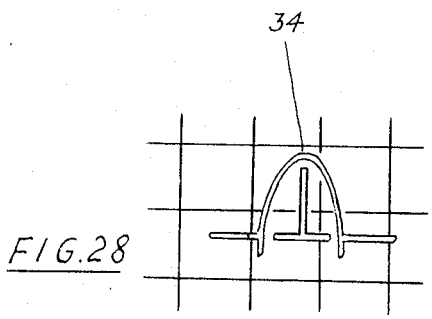
FIG. 28 shows an exact zero indication of the aircraft symbol of FIG. 27.

The information for the situation as well as the command is amplified remarkably, when a simple symbol of a leading aircraft is presentd additionally by the known methods of symbol generation by cathode rays. A short section of the channel at a certain distance in front of the landing aircraft can be replaced by a symbol of a preceding aircraft. This would, for example, accurately fly along the straight desired path otherwise, or simultaneously, presented, e.g., by the approach channel. Two cross sections at the positions of the wings and the tailplane perpendicular to the longitudinal axis symbolize a preceding aircraft (FIGS. 23, 24). Rudimentary wings 31 are provided on each side of, for example, a half elliptical fuselage/landing gear element 32. An inverted T-symbol 33 representing the tail-plane, is located with respect to the fuselage element with small but easily perceptible gaps 34 (FIG. 28) for the sensitive indication of zero errors.

Thus, the system for presenting information to the pilot includes a symbol of an aircraft formed of at least two symbolized cross sections at representative points on the longitudinal axis of an imaginary preceding aircraft (wing and tail regions). The relative position of the two section symbols and the position of both symbols on the display screen present information regarding position and attitude of the pilot to aircraft in relation to the desired path. The tail symbol is calibrated so as to leave small gaps between its three ends and the other symbol in the event there is zero deviation. The wing symbols are opposed to the horizontal part of the tail symbol and the aircraft symbol itself varies its position on the display screen and the cross section symbols vary their positions relative to each other so as to present a symbol of an imaginary preceding aircraft in a fixed but selectible distance in front of the pilot moving along the desired flight path.

Lateral and vertical deviations from the straight ideal flight path of the apparently preceding aircraft according to a leading aircraft in a formation flight are indicated by a proportional offset of the tailplane element in relation to the wing/fuselage element. The sensitivity of this error indication is given by the selected distance R between the leading symbol and following aircraft and by the effective fuselage length L (see FIGS. 30–31). In these figures the landing aircraft, wherein the observer of the display screen is situated, flies below and to the right of the smbolic leader. The parameters $y^*..z^*$ and $\tilde{y}, \tilde{z}$ are proportional to the lateral ($y_g$) and vertical ($v_g$) errors respectively according to the following equations:

$$\tilde{y} = \frac{1}{R} y_g; \quad y^* = \frac{L}{R^2} y_g; \quad \text{or} \quad y^* = \frac{L}{R(R-L)} y_g$$

$$\tilde{z} = \frac{1}{R} z_g; \quad z^* = \frac{L}{R^2} z_g; \quad \text{or} \quad z^* = \frac{L}{R(R-L)} z_g$$

for the case when R is selected not to be much longer than L.

Furthermore, $$\theta^* = \theta - \tilde{z}; \quad \psi^* = \psi - \tilde{y}$$

where $\theta$ is the pitch angle and $\psi$ is the heading angle. Tests have shown that landings may be controlled with the same ease and accuracy, when $\tilde{z}$ and $\tilde{y}$ are omitted. The impression of formation flight is not adversely affected but the display generation is simpler. The distance R should be selected according to the characteristics of the landing aircraft so as to provide sufficient margin for directional changes during the glide path interception phase and for skin rate reduction during flare. Each of the symbols, the channel and the leading aircraft, effect the same advantageous control characteristics, because they originate from the same design principle. In some cases, e.g., in terrain following flight, it is useful especially to present both symbols together.

The present system presents a pictorial situation display for presenting information for the control of the movement of the aircraft maneuverable in three dimensions in a surrounding medium. The display device shows on its face, (cathode ray tube) a complete set of information necessary for stabilization and control of the attitude and path of the aircraft. The different informations are completely integrated and yet still available separately in quantitative measures and tolerances for the path of the moving vehicle in realistic units of magnitude, such as the width of the runway, the height of the fences, the height of the cockpit above the ground, the distance of obstacles from the desired path, the wing span of an aircraft symbol, all of which are required for navigation and are presented pictorially by symbols closely correlated to the features surrounding the line which represents the prescribed, or desired path. The pictorial presentation is sensitive to bank angle, the heading, pitch angle, lateral and vertical deviation from the desired path and the longitudinal distance to important fixes along the desired path. The pictorial presentation contains inherent pitch and heading command as well as rate information and these information quantities are presented with a sensitivity comparable to that in final landing phase just above or on the ground and in formation flight.

With this type of display, the pilot is able to detect even small reactions of the aircraft such as are caused by external influences and to correlate them with his own sensitivity to changes in motion such as acceleration. Thus, the system offers the pilot a better control that has been possible with other known information display systems. The form in which the information is presented gives the pilot a quick and reliable orientation, eliminates the disadvantages of having to scan numerous guidance indicators since with the pictorial display all important guidance information has been integrated and yet is still available in separate from without additional symbols, reaction time delay has been eliminated since no additional scales and numerals need be displayed, read and processed before the pilot actuates the controls, control of the aircraft has been simplified since this type of pictorial information already includes inherent command, preview and velocity vector characteristics, and information such as the rate of descent and rate of lateral closure is not required explicitely due to the high sensitivity of position and attitude indications. The reticle of conventional "vertical situation"

displays as for example an artificial horizon instrument, is marked by an aircraft symbol representing the aircraft in flight. With the present arrangement, however, this is not required and furthermore it does not match the benefits of contact analog displays where the screen presents a front window in which the aircraft, which contains the display, is never visible. Furthermore, the aircraft symbol would interfere with the symbol of a leading aircraft. The presentation of a rectangular grid where the center reticle (cross wires) emphasized in more suitable.

Figure 34:
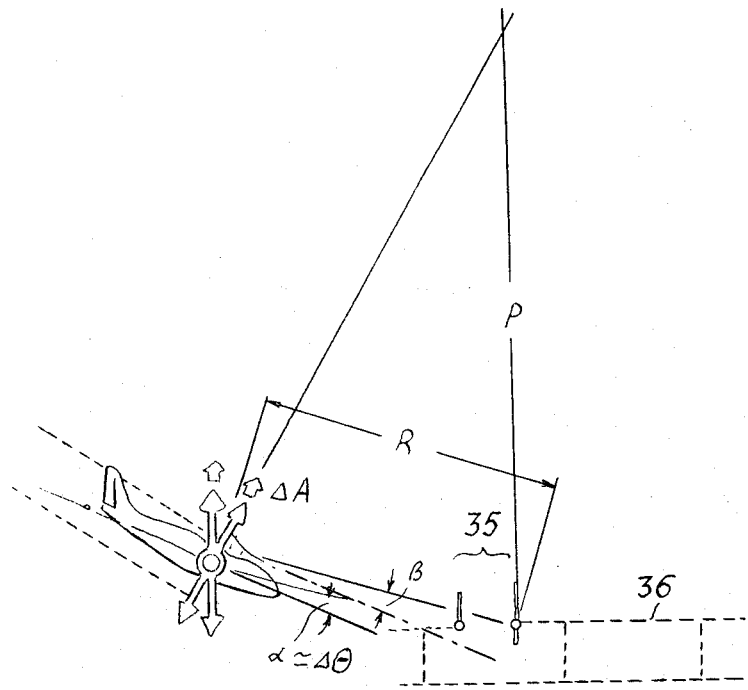
FIG. 34 illustrates the inherent vertical command characteristics of the lead aircraft and the channel, separate or in combination.

The changes in longitudinal distance between leading and following aircraft in actual formation flight are not used as a speed error indication. This information would not be accurate enough and the sensitivity of the deviation information ($Z_g$, $Y_g$) would vary with distance R which is not desirable. Instead of this, the symbol of the leading aircraft precedes with a fixed distance along the ideal glide path straight down to the position AP at glide slope/runway intersection. At this moment it tips up from the approach attitude to the horizontal and continues to 'roll" along the center line of the runway. This is indicated by the tailplane jumping accordingly to a somewhat lower position (FIGS. 32 and 33) and moving upwards again with a rate proportional to the sink rate of the "following" aircraft. The aircraft symbol (35, FIG. 34) preceding on an upward or downward deflecting path or a respective section of the channel ahead (36, FIG. 34) appears on the display screen at a certain vertical deflection representing a relative elevation angle $\beta$. The real aircraft, however, needs a change in angle of attack $\alpha$ or, at a constant speed, in pitch attitude $\Delta\theta$ in the same direction as $\beta$, in order to produce a lift increment $\Delta A$ resulting in a curved path with radius $\rho$. $\beta$ depends upon the apparent distance R (FIG. 34) between the leading symbol and the aircraft. Thus $\beta$ can be made equal to $\Delta\theta$ by the selection of a proper R, which only depends upon atmospheric and aerodynamic aircraft data. The aircraft will fly a smooth trajectory if the center of the reticle is always directed to the leading symbol. In case of a uniform curvature of the path of the preceding symbol, the aircraft will follow this path exactly.

The reticle of the display screen can be easily adjusted in attitude in relation to the leading aircraft symbol (or vice versa) by the pilot shortly after he has stabilized the aircraft on the approach path. He will and should select a setting so that the reticle center will represent the longitudinal axis of the aircraft parallel to the wind axis at the average approach speed. However, the adjustment might be controlled automatically according to the small changes in approach speed or angle of attack respectively.

The display screen is provided with series of equidistant vertical and horizontal lines parallel to the reticle (FIG. 14). The distance of the horizontal lines, especially to the first line below the reticle should be selected so as to provide an optimum aid for the use of the flare director effect especially in case of the simplified circuitry, where $\bar{z}$ and $\bar{y}$ are eliminated. When the reticle is adjusted manually as mentioned above, the elevator should be manipulated after the above-mentioned down jump of the tailplane of the leading aircraft so that coincidence of the first line below the center with the tailplane, moving upwards during further descent of the aircraft, is maintained. If the distance of the lines is selected properly according to the flare characteristics of the aircraft, its wheel height above the runway decreases according to the mathematical law of a tractrix, which is desirable. The same control strategy may be applied with the same success for the channel-type symbol too. The vertical lines should be spaced according to an appropriate azimuth scale.

The wings of the aircraft symbol may be always level representing zero bank, i.e., the horizon, In some cases, however, it can be useful to indicate the optimum roll angle by banking the symbol accordingly. In the latter case deviation from zero bank angle is to be indicated.

Figure 35:
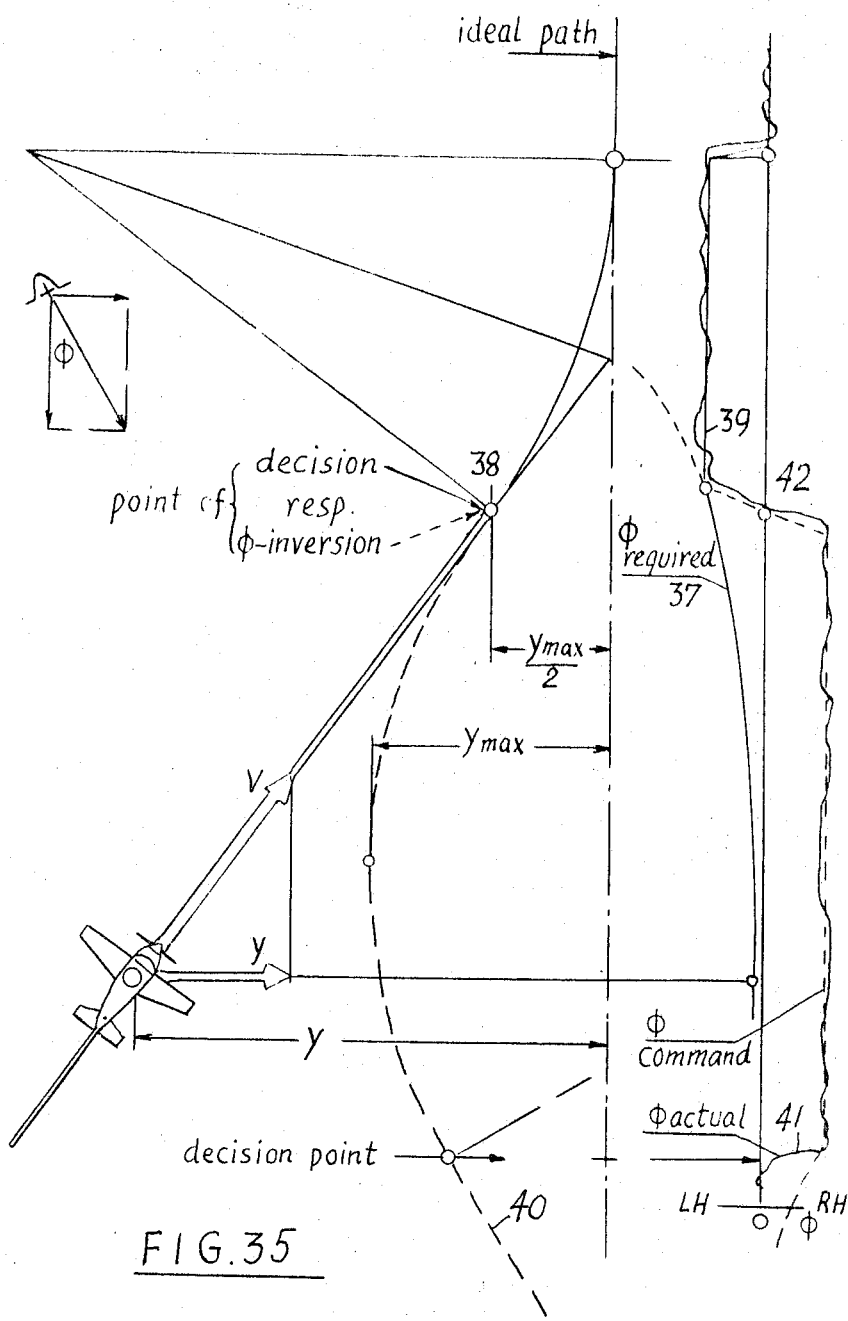
FIG. 35 is a plan view of the interception of an ideal path for the derivation of a nonasymptotic bank angle command.

The usual asymptotic interception flight path, which requires continuous attitude changes according to the computing laws for flight director signals have been shown to be not desirable for the human pilot. He prefers to change to new attitudes and to maintain them until a further change is necessary. This is realized by a command indication for a constant bank angle $\phi$ dependent upon the lateral error $y_g$ and the rate of closure $\dot{y}$ (which is equal to the ground speed factored by the angle between flight path and ideal ground track). It may be easily derived from FIG. 35 that the equation
$\phi_r = \dot{y}^2/2_{gy}$
is a good approximation for usual bank angles and rate of closure, where "g" is the gravity acceleration and $\phi_r$ the required bank angle. When an aircraft approaches the ideal path from a lateral offset with a certain heading (FIG. 35, solid thick line) the director will indicate an increasing bank angle according to the decreasing $y_g$ (see FIG. 35, curve 37). The pilot will decide to change the bank angle at a certain moment 38 to the momentary value $\phi_r$. As soon as $\phi$ reaches $\phi_r$, $\phi_r$ stops further increase and remains constant and is called $\phi_{command}$ (= $\phi_c$) 39. The pilot has to maintain $\phi = \phi_c$ until interception is completed, where $\phi$ is returned to $\phi = 0$. This principle can be extended for cases, where a $y_g$-increasing heading is flown (FIG. 35 broken line 40).

An arbitrary $\phi$ towards the path desired within the limits normally used is selected by the pilot 41. When this $\phi$ is achieved he engages the director indication to this $\phi$, by pressing a push button, for example. Then he is commanded by fly this bank through the turn towards the desired path (broken line) until approaching 50 percent of $y_{max}$, which was given into an electronic memory. At this moment, the bank command is inverted 42 to the opposite $\phi$ of the same amount which the pilot has to follow now. From this moment the procedure is the same as described before. Tolerances for the bank reverse are to be provided according to control response characteristics and the approach speed of the aircraft. Under certain conditions of large offsets it may be useful, to interrupt the bank reverse by a straight section of the flight path with $\phi_c = \phi = 0$.

The airspeed of an aircraft is to be maintained within close tolerances during a landing. The advantages of the displays described would deteriorate if the airspeed error would be displayed in the conventional manner. It is important not to force the pilot to remove his eyes from the source of the primary situation information for speed check. Therefore, the speed information is to be presented, e.g., in a non-geometric form and/or by indications clearly perceptible by indirect peripheral vision. The display area or parts of it can be colored depending upon the speed error by the rainbow scale, for example. Green indicates the correct speed, changing through yellow-orange to red when flying too slow or changing to blue and violet when flying too fast. This or another color code can, for another example, be combined with a vertical tape speed indicator so that, by indirect peripheral recognition only, speed errors can be monitored without fixation.

A third form is the presentation of speed error by rate information, generated by, for example, a barber pole-textured strip moving on the side of the display area vertically or, in perspective view, longitudinally. The recticle lines are provided with this barber pole motion in the last example.

What is claimed is:

1. A pictorial situation display system for presenting information for the control of the movement of an aircraft comprising a screen for displaying a pictorial representation of information necessary for stabilization and control of the attitude and desired path of the aircraft during a given navigational phase and means for displaying on the screen in a quantitative estimatible form the pictorial representation containing as parameters the bank angle, heading angle, pitch angle, and lateral and vertical deviation from a predetermined path, said display means including means for generating symbols on said screen precisely correlated to real and simulated outside environment features closely surounding the desired path pictorially representing the desired path as a three-dimensional view of a rectangular channel representing a runway and the flight path leading to the runway and formed by a bottom plane having a center line and two vertical sidewall planes on opposite edges of the bottom plane, each having a longitudinal line in a predetermined relation to the bottom plane and a conceptual plane through the longitudinal lines of the side wall planes locating the predetermined path relative to the pilot's eyes.

2. A pictorial situation display system for presenting information for the control of the movement of an aircraft comprising a screen for displaying a pictorial representation of information necessary for stabilization and control of the attitude and desired path of the aircraft during a given navigational phase and means for displaying on the screen in a quantitative estimatible form the pictorial representation containing as parameters the bank angle, pitch angle, heading angle, and lateral and vertical deviation from a predetermined path, said display means including means for generating an aircraft symbol on said screen representing an image of a single aircraft located along said predetermined path, said symbol being formed by a fuselage and wing section and a tail section of an inverted T-shape, said generating means including means to move said sections relative to each other on the display screen to present a perspective view of said angle aircraft relative to the position and attitude of the piloted aircraft in relation to the predetermind path, the tail section being so dimensioned in relation to the fuselage and wing section that only at zero deviation from the predetermined path is it located within the fuselage and wing section with small gaps between its ends and the fuselage section, the wings of said fuselage section being horizontal and in line with the crosspiece of the tail section.

3. A system as claimed in claim 1 wherein said display means includes means for generating a channel symbol representing a runway, the height of said longitudinal lines on the said side wall planes being equal to the elevation of the pilot's eyes at the moment of touchdown, whereby the pilot can sense the touchdown at the same time he observes the perspective angle of the upper edges of said side wall planes extending to 180° and where the width of the channel along the runway is such that safe separation between a wheel of said aircraft which is closest to the respective edge of the runway is assured when the eyes of the pilot laterally approach the position of the respective said side wall plane and where the channel extends into the sector of the airspace at the end of the runway, which is used for landing approach and is deviated upwardly so that said longitudinal lines are equal to the desired path of the pilot's eyes.

4. A system as claimed in claim 3 wherein the height of said longitudinal lines is reduced after the touchdown indicating the elevation of the pilot's eyes when the aircraft is at its normal taxi attitude.

5. A system as claimed in claim 2 wherein the sections forming the aircraft symbol on the display screen represent the preceding aircraft in a fixed but selectible distance in front of the piloted aircraft moving along the flight path as if on a conceptual rail-like path extending in the case of landing guidance directly downwardly to the intersection of the glide slope and the runway, said conceptual path tipping up this position from the approach attitude to the horizontal which tipping up is indicated by the tail symbol dropping down relatively to the fuselage and wing section of the aircraft symbol.

6. A system as claimed in claim 3 wherein the motion vectors of the pictorial representation which gives the appearance of expanding as the aircraft moves are determined by computation and the points are generated by cathode ray traces, which are of low intensity relative to the remainder of said pictorial representation so as to be practically invisible except at the point where the traces intersect and are thus brighter.

7. A system as claimed in claim 2 wherein the optimum bank angle for ideal interception and hold is indicated by the wings of the leading aircraft symbol, the deviation from zero bank being indicated by an additional marking.

8. A system as claimed in claim 1 wherein the field of view represented on the display screen area corresponds to the angular field of view through a respective imaginary window at the position of the display screen through which window the pilot would see the outside environment features as projected on the screen surface the field of view having a 1:1 or smaller angular relationship to the space outside the aircraft a reticle on the display area representing a longitudinal axis in the symmetry plane adjustable in pitch to be parallel to the wing axis or to the glide path in relation to the ground.

9. A system as claimed in claim 8 wherein the position of said symbols relative to each other is determined by position measuring devices on the ground and the attitude angles of the aircraft are measured by sensors on the piloted aircraft.

10. A system as claimed in claim 2 wherein for an aircraft approaching the ideal path from a lateral offset a command for the bank angle for ideal interception which correspnds to the equation $\phi_{req} = \dot{y}^2/2gy$ is presented and the momentary value of $\phi_{req}$ is maintained from the first moment when the actual $\phi$ reaches $\phi_{req}$ and whereby $\phi_{req}$ is reduced to zero when interception is completed and wherein for aircraft flying a heading which increases the lateral offset the maximum usable bank angle towards the ideal path is commanded, the maximum lateral offset $y_{max}$ is stored electronically and the $\phi_{req}$ is reversed to the opposite command as soon as 50 percent of $y_{max}$ is approached, and where $\phi_{req}$ is the required bank angle, $y$ is the lateral deviation from the desired path, $\dot{y}$ is the rate of change of $y$ and $g$ is the gravity constant.

11. A system as claimed in claim 1 wherein the airspeed is displayed by a speed-error dependent coloring of at least part of the display area.

12. A system as claimed in claim 1 wherein said symbols generating means is adapted to present said symbols in the form of a plurality of dots.

13. A system as claimed in claim 1 wherein said symbols generating means is adapted to present said symbols in the form of a plurality of lines.

14. A system as claimed in claim 1 wherein said symbols generating means is adapted to present said symbols in the form of perspective planes.

15. A system as claimed in claim 3 wherein an additional height line is provided indicating the elevation of the pilot's eyes when the aircraft is at its normal taxi attitude.

16. A system as claimed in claim 1 wherein the airspeed is displayed by a colored scale moving in relation to a pointer.

17. A system as claimed in claim 1 wherein the airspeed is displayed by a check textured strip moving according to speed-error.

* * * * *